G. LAUDER.
Joints for Wrought Iron Pipes.
No. 158,953.                          Patented Jan. 19, 1875.
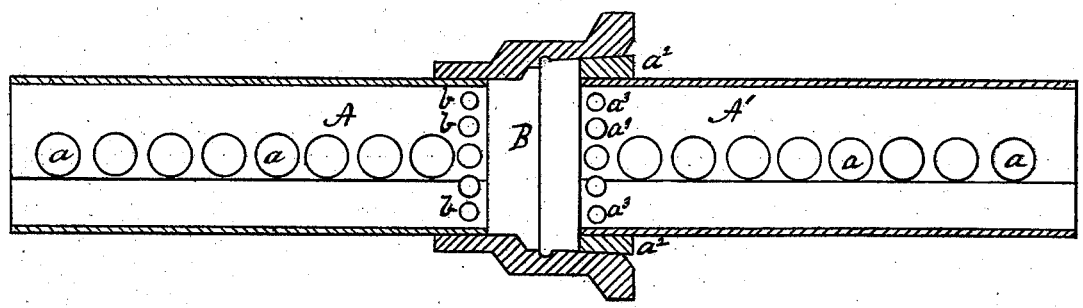
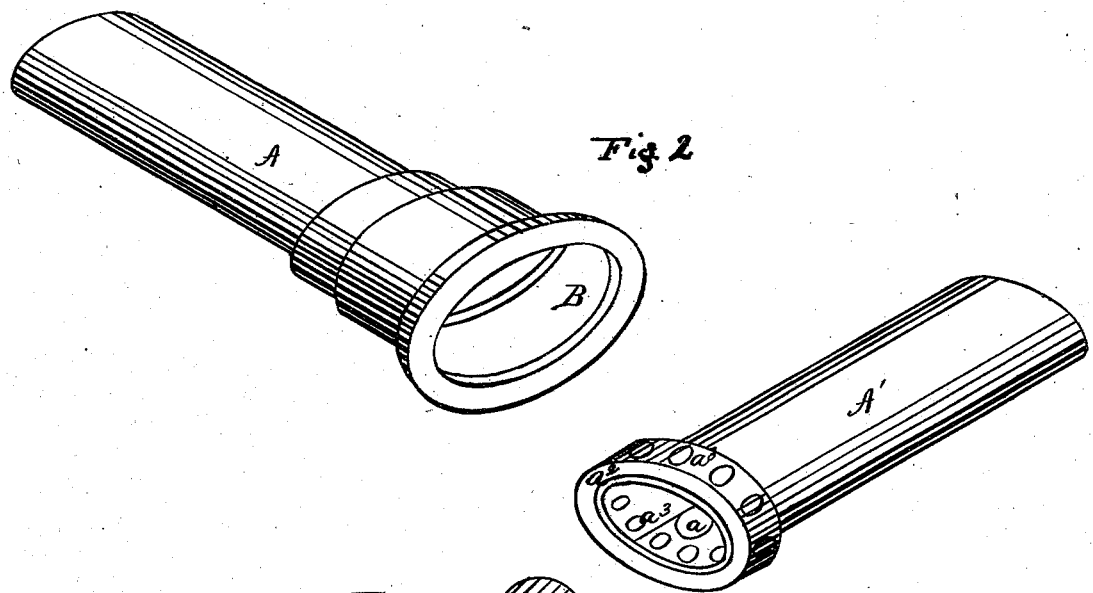
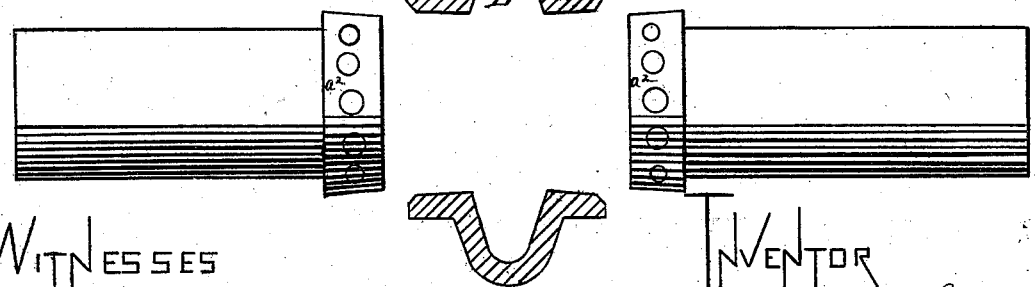
Witnesses
James E. Kay
R. R. Baely
Inventor
George Lauder
by Bakewell & Kerr
Attys

UNITED STATES PATENT OFFICE.

GEORGE LAUDER, OF PITTSBURG, PENNSYLVANIA, ASSIGNOR TO HIMSELF AND THOMAS M. CARNEGIE, OF SAME PLACE.

IMPROVEMENT IN JOINTS FOR WROUGHT-IRON PIPES.

Specification forming part of Letters Patent No. 158,953, dated January 19, 1875; application filed December 8, 1874.

*To all whom it may concern:*

Be it known that I, GEORGE LAUDER, of Pittsburg, in the county of Allegheny and State of Pennsylvania, have invented a new and useful Improvement in Joint for Wrought-Iron Pipe; and I do hereby declare the following to be a full, clear, and exact description thereof, reference being had to the accompanying drawing forming a part of this specification, in which—

Figure 1 is a section of wrought-iron pipe and socket. Fig. 2 is a perspective view of pipes detached; and Fig. 3 is a view of pipes detached, and sectional view of an expansion-joint.

Like letters refer to like parts wherever they occur.

My invention relates to the manner of forming joints for wrought-iron pipes, mains, &c.; and it consists in securing a metal ring to the spigot end of the pipe, said ring being slightly tapered to correspond with a taper formed on the inside of the socket, whereby the close union may be made between the pipe and socket without the usual leading and luting heretofore required.

My invention is more especially directed to the formation of joints for wrought-iron pipes used in the construction of mains, and elsewhere, when pipes of great diameter and length are employed.

In such cases the pipes will often be from twenty-five to thirty feet in length, and from four to four and half feet in diameter, and are generally united by cast sockets, the joints being made close by the application of lead or cement, a process involving much labor and expense, and often unsatisfactory in its results. The labor of closing the joints is also much increased by the disadvantages arising from the necessity of making the joint at the time of laying the pipe, the operator having to work within a limited space. The object of the present invention is to overcome these difficulties by so constructing the pipe that little or no labor is required to make a tight joint at the time of laying the pipe, the several parts of the pipe and sockets having been previously adapted or fitted.

I will now proceed to describe my devices so that a person skilled in the art may make and use the same.

In the drawing referred to, A A' represent pieces of wrought-iron tubing, which may be formed (as in the case of large pipes is generally practiced) by riveting, as at $a$ $a$. B is a socket, which is secured to one end of pipe A by riveting, as at $b$, or in other suitable manner, and is turned or bored out slightly tapering to correspond to the taper given to the spigot end of pipe A'. The pipe A' is furnished at the spigot end with a metal ring, $a^2$, attached by rivets as at $a^3$, or in other suitable manner, and turned or rolled with a slight taper so as to correspond with the sockets. In boring the socket, and turning the spigot-ring $a^2$, I have found that a taper of one in sixty-four will give good results. Instead of riveting the socket to one of the pipes, an expansion-socket, such as shown at B', Fig. 3, may be employed, in which case both ends of the pipe will be finished with spigot-rings $a^2$, and the socket tapered toward both ends. This form of joint will meet many requirements not so fully answered by securing the socket to one end of the pipe.

In laying the pipes the joints are made by simply coating the turned and bored parts with a suitable cement of asphalt, or other material, and then driving the parts together.

I am aware that joints for tubing have been made by compressing lead and other packing rings between the end of the pipe and the tapering socket, and lay no claim to such devices; but Having described my invention, what I claim is—

A joint for wrought-iron pipes, consisting of the socket B bored, as described, in combination with pipe A', provided with a tapered spigot-ring, $a^2$, secured to the pipe, substantially as and for the purpose specified.

In testimony whereof I, the said GEORGE LAUDER, have hereunto set my hand.

GEORGE LAUDER.

Witnesses:
W. N. PAXTON,
JAMES I. KAY.